United States Patent
Shakur

(10) Patent No.: US 9,669,382 B2
(45) Date of Patent: Jun. 6, 2017

(54) METHODS AND APPARATUSES FOR ISOMERIZING HYDROCARBONS

(71) Applicant: UOP LLC, Des Plaines, IL (US)

(72) Inventor: Mohamed S. Shakur, Hoffman Estates, IL (US)

(73) Assignee: UOP LLC, Des Plaines, IL (US)

(*) Notice: Subject to any disclaimer, the term of this patent is extended or adjusted under 35 U.S.C. 154(b) by 381 days.

(21) Appl. No.: 14/135,750

(22) Filed: Dec. 20, 2013

(65) Prior Publication Data

US 2015/0175506 A1 Jun. 25, 2015

(51) Int. Cl.
| | |
|---|---|
| *C07C 5/22* | (2006.01) |
| *C07C 5/13* | (2006.01) |
| *B01J 19/24* | (2006.01) |
| *C10G 45/62* | (2006.01) |
| *C10G 45/58* | (2006.01) |
| *C10G 70/04* | (2006.01) |
| *B01D 53/22* | (2006.01) |
| *B01D 53/68* | (2006.01) |

(52) U.S. Cl.
CPC .............. *B01J 19/24* (2013.01); *C10G 45/58* (2013.01); *C10G 45/62* (2013.01); *C10G 70/045* (2013.01); *B01D 53/228* (2013.01); *B01D 53/68* (2013.01); *B01D 2257/108* (2013.01); *B01D 2257/2045* (2013.01); *C10G 2300/104* (2013.01); *C10G 2300/305* (2013.01); *C10G 2300/4081* (2013.01); *C10G 2300/42* (2013.01); *C10G 2400/02* (2013.01)

(58) Field of Classification Search
CPC ............ C07C 5/13; C07C 5/22; C07C 5/2791
See application file for complete search history.

(56) References Cited

U.S. PATENT DOCUMENTS

| | | | |
|---|---|---|---|
| 5,227,554 A * | 7/1993 | Chou ..................... | C07C 5/226 585/301 |
| 5,382,730 A * | 1/1995 | Breckenridge .......... | C07C 5/10 208/60 |
| 6,380,452 B1 * | 4/2002 | Davis .................. | B01D 53/228 585/734 |
| 6,428,606 B1 | 8/2002 | Gottschlich et al. | |
| 6,896,717 B2 | 5/2005 | Pinnau et al. | |
| (Continued) | | | |

FOREIGN PATENT DOCUMENTS

WO 2013057492 A1 4/2013

OTHER PUBLICATIONS

Phair et al., Review of proton conductors for hydrogen separation, 2006, Ionics, vol. 12, pp. 103-115.*

*Primary Examiner* — In Suk Bullock
*Assistant Examiner* — Youngsul Jeong

(57) ABSTRACT

Methods and apparatuses are provided for isomerizing a hydrocarbon stream. The method includes isomerizing a hydrocarbon stream in a reactor to produce an intermediate isomerized stream. The intermediate isomerized stream is fractionated to produce an off gas stream and a heavy isomerized stream, where the off gas stream includes an off gas recycle stream. The off gas recycle stream is dried in an off gas dryer to produce a hydrogen recycle stream, where the off gas drier includes an off gas dryer membrane separating the off gas recycle stream from an off gas purge stream. The off dryer membrane includes a perfluorosulfonated ionomer. The hydrogen recycle stream is then fed into the reactor.

13 Claims, 3 Drawing Sheets

(56) References Cited

U.S. PATENT DOCUMENTS

| | | |
|---|---|---|
| 7,025,804 B2 | 4/2006 | Simmons et al. |
| 7,799,964 B2 | 9/2010 | Minhas et al. |
| 7,947,117 B2 | 5/2011 | Giroudiere et al. |
| 8,057,773 B2 | 11/2011 | MacArthur et al. |
| 8,101,009 B2 | 1/2012 | Ekiner et al. |
| 8,127,937 B2 | 3/2012 | Liu et al. |
| 8,388,743 B2 | 3/2013 | Suzuki et al. |
| 2008/0019902 A1 | 1/2008 | Rei et al. |
| 2009/0277837 A1 | 11/2009 | Liu et al. |
| 2010/0133192 A1 | 6/2010 | Liu et al. |
| 2011/0266220 A1 | 11/2011 | Campos et al. |
| 2012/0322119 A1 | 12/2012 | Liu et al. |

* cited by examiner

METHODS AND APPARATUSES FOR ISOMERIZING HYDROCARBONS

TECHNICAL FIELD

The present disclosure generally relates to methods and apparatuses for isomerizing hydrocarbons, and more particularly relates to methods and apparatuses for isomerizing hydrocarbons having about 4 to about 7 carbon atoms.

BACKGROUND

Isomerization is often used to increase the octane rating of light hydrocarbons, such as pentane, hexane, and heptane used in gasoline. For example, a single pass of some hydrocarbons, such as pentane and hexane mixtures, through an isomerization unit can increase the octane rating from about 50-60 to about 80-93. Butanes are not typically used in gasoline, but butanes are isomerized to produce more valuable products as well. The catalyst used in many isomerization units is in a chlorided state, and oxygenates in the feed produce water which displaces chlorine on the catalyst. The displaced chlorine is discharged as hydrochloric acid (HCl), and a chloriding agent is added to the isomerization process to replace discharged chlorine. Water acts as a poison to the catalyst and reduces the catalyst life expectancy. Because one of the primary oxygenates in many feed streams is water, the feed stocks are dried to remove as much water as possible before the reaction. Any other oxygenates in the feed generally react and form water.

The isomerized product is fractionated, and the hydrochloric acid exits the fractionation column with excess hydrogen and other low boiling compounds typically in an overheads stream. The hydrochloric acid in the overheads stream is corrosive, which further complicates treatment or other processing needed to re-use the discharged hydrogen. The overheads stream is often treated in a sodium hydroxide (caustic) scrubber to remove the hydrochloric acid, and then is disposed of or further processed. Hydrogen is a valuable compound in the off gas from the caustic scrubber, but water in the off gas discharged from the caustic scrubber makes re-use in the isomerization unit impractical.

Make-up hydrogen is added to the isomerization reactor, and dual molecular sieve dryers are often used to remove any entrained water. The molecular sieves typically used for drying the hydrogen and hydrocarbon feed streams need to be regenerated frequently and is usually replaced about every 2 to 4 years, which increases maintenance costs and capital costs to provide duplicate equipment to run the isomerization unit when one molecular sieve dryer is out of service for the regeneration or replacement of the adsorbent.

Accordingly, it is desirable to develop methods and apparatuses for drying and recycling hydrogen discharged from hydrocarbon isomerization units, including recycling of discharged chloriding agents such as HCl. In addition, it is desirable to develop methods and apparatuses for drying hydrogen make-up feed stocks with lower maintenance and operating costs. Furthermore, other desirable features and characteristics of the present embodiment will become apparent from the subsequent detailed description and the appended claims, taken in conjunction with the accompanying drawings and this background.

BRIEF SUMMARY

Methods and apparatuses for isomerizing hydrocarbons are provided. In an exemplary embodiment, a method includes isomerizing a hydrocarbon stream in a reactor to produce an intermediate isomerized stream. The intermediate isomerized stream is fractionated to produce an off gas stream and a heavy isomerized stream, where the off gas stream includes an off gas recycle stream. The off gas recycle stream is dried in an off gas dryer to produce a hydrogen recycle stream, where the off gas dryer includes an off gas dryer membrane separating the off gas recycle stream from an off gas purge stream. The off dryer membrane includes a perfluorosulfonated ionomer. The hydrogen recycle stream is then fed into the reactor.

In accordance with another exemplary embodiment, a method for isomerizing hydrocarbons includes contacting a hydrocarbon stream with a catalyst to produce an intermediate isomerized stream. A raw make-up hydrogen stream is dried in a make-up hydrogen dryer to produce a feed make-up hydrogen stream that is contacted with the catalyst and the hydrocarbon stream. The make-up hydrogen dryer includes a make-up hydrogen membrane separating the raw make-up hydrogen stream from a make-up hydrogen purge stream, and the make-up hydrogen membrane includes a perfluorosulfonated ionomer.

In accordance with a further exemplary embodiment, an apparatus for isomerizing hydrocarbons includes a reactor configured to contain a catalyst. A fractionation zone is fluidly coupled to the reactor, where the fractionation zone is configured to produce an off gas stream at an overheads outlet and a heavy isomerized stream at a bottoms outlet. An off gas dryer is fluidly coupled to the overhead outlet, where the off gas dryer includes an off gas dryer membrane positioned to separate an off gas recycle stream from an off gas purge stream, and where the off gas dryer membrane includes a perfluorosulfonated ionomer. The off gas dryer is fluidly coupled to the reactor.

BRIEF DESCRIPTION OF THE DRAWINGS

The present embodiment will hereinafter be described in conjunction with the following drawing figures, wherein like numerals denote like elements, and wherein.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The various embodiments described herein relate to methods and apparatuses for producing an isomerized hydrocarbon having 4 to 7 carbon atoms (otherwise represented as C4-7, where "C" refers to the element carbon, and the number(s) following refer to the number of carbon atoms in the hydrocarbon molecule.) The hydrocarbon feed primarily includes straight chain hydrocarbons that are isomerized in a reactor containing a catalyst. In many embodiments, the catalyst is used in a chlorided state, and water and other oxygen containing compounds (oxygenates) displace chlorine from the catalyst. The isomerized stream exiting the reactor is fractionated into an off gas stream and a heavy isomerized stream, where the heavy isomerized stream includes branched hydrocarbons produced in the reactor. The off gas is dried in an off gas dryer, where the off gas dryer has an off gas dryer membrane of a perfluorosulfonated ionomer. The off gas stream flows on one side of the off gas dryer membrane, and a dry off gas purge stream flows on the other side. Water is absorbed from the off gas stream by the perfluorosulfonated ionomer membrane, transported across the membrane, and discharged into the dry off gas purge stream. Hydrochloric acid, hydrocarbons, hydrogen, and other compounds are not transported across the membrane, so the off gas stream is converted to a hydrogen recycle stream when the water is removed. The hydrogen recycle stream is then fed into the reactor, which reduces or eliminates the need for make-up hydrogen and/or additional chloriding agents. Alternatively or additionally, a make-up hydrogen dryer is used to dry the make-up hydrogen stream.

Figure 1:
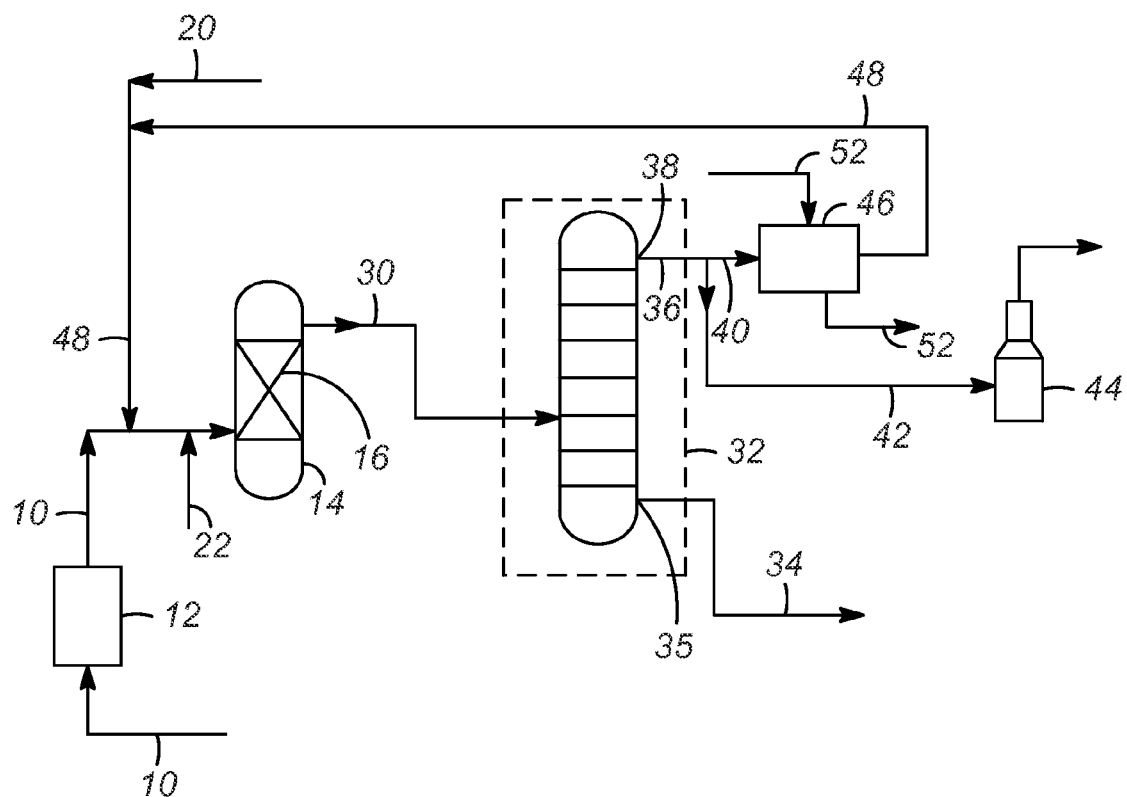
FIG. 1 is a schematic diagram of an exemplary embodiment of an apparatus and a method for isomerizing a hydrocarbon stream.

Reference is now made to the exemplary embodiment illustrated in FIG. 1. A hydrocarbon stream 10 is dried in an optional hydrocarbon dryer 12 before entering a reactor 14. The hydrocarbon stream 10 primarily includes hydrocarbons with 4 to 7 carbon atoms, where about 80 mass percent or more of the hydrocarbon stream 10 is C4-7. In one embodiment, the hydrocarbon stream 10 is about 80 mass percent or more C4 compounds, and in another embodiment the hydrocarbon stream 10 is about 80 mass percent or more C5-6 compounds. The hydrocarbon molecules in the hydrocarbon stream 10 are primarily straight chain compounds, such as N-butane, N-pentane, N-hexane, and/or N-heptane. The hydrocarbon stream 10 may be produced by a wide variety of oil refinery operations, such as crude oil distillation, or fractionation after catalytic cracking or reforming. Other sources for the hydrocarbon stream include coal liquefaction processes, waste treatment processes, etc. The hydrocarbon dryer 12 may be a molecular sieve, a distillation column, an adsorption dryer, or other types of dryers. The hydrocarbon stream 10 is introduced to the hydrocarbon dryer 12 in a liquid state in many embodiments, but the hydrocarbon stream 10 may also be in the vapor phase before being dried. In an exemplary embodiment, the water concentration in the hydrocarbon stream 10 downstream from the hydrocarbon dryer is about 10 parts per million by weight (PPM) or less.

After optional drying, the hydrocarbon stream 10 is fed into the reactor 14, where it is contacted with a catalyst 16 at isomerization conditions. The isomerization is normally conducted in a fixed bed liquid/vapor phase or vapor phase process, where hydrogen is mixed with the hydrocarbons when passing over the isomerization catalyst 16. The hydrogen mixed with the hydrocarbon stream 10 during the isomerization reaction can be supplied from a variety of sources. In one embodiment, the hydrogen is supplied by a feed make-up hydrogen stream 20, and the feed make-up hydrogen stream 20 may be dried in a dryer (not shown) upstream from the reactor 14. In some embodiments, hydrogen is present in the reactor 14 from about 0.01 to about 10 moles of hydrogen per mole of hydrocarbon. In other embodiments, hydrogen is present in the reactor 14 from about 0.01 to about 2 moles of hydrogen per mole of hydrocarbon. The presence of hydrogen favorably improves the conversion of normal hydrocarbons to branched hydrocarbons, especially hydrocarbons branched at the number 2 carbon position. Furthermore, the presence of hydrogen in the reactor 14 helps reduce the formation of coke which tends to poison the catalyst 16.

A chloriding agent may also be introduced to the reactor 14 by a chloriding stream 22, where acceptable chloriding agents include, but are not limited to, hydrochloric acid, perchloroethylene, trichloroethylene, and trichloroethane. Sufficient chloriding agent is added to maintain the catalyst 16 in a chlorided state, where a chloride ion is ionically or covalently bonded to the catalyst, as understood by those skilled in the art. The exact chloriding mechanism may vary, but in some embodiments the chloriding agent forms hydrochloric acid that reacts with the catalyst. For example, oxygen atoms in alumina may be replaced by chlorine atoms, or the catalyst may form a salt with the chloride ion. Higher concentrations of water or other oxygenates in either the hydrogen or the hydrocarbon stream 10 increase the quantity of chloriding agent that is needed to maintain the catalyst 16 in a chloride state. In some embodiments, the hydrogen and/or hydrocarbon stream 10 include a chloriding agent, which decreases the amount that must be added by the chloriding stream 22. In another embodiment, the catalyst 16 is not chlorided, and no chloriding stream 22 is added.

In an exemplary embodiment, the reactor 14 is configured to contain the catalyst 16 in a fixed bed for either upward flow or downward flow, and the reactor 14 may include a plurality of reactors in series, in parallel, or in series and parallel. A heat transfer unit (not shown) may be included to heat the hydrocarbon stream 10 and any other streams entering the reactor. In embodiments with two or more reactors 14 in series, the hydrocarbons may be heat exchanged between the reactors 14. The heat transfer unit may use effluent from the reactor 14 for heat in some embodiments, but other sources of heat can also be used. The hydrocarbon stream 10 contacts the catalyst 16 at isomerization conditions, which are relatively moderate. For example, for C5-6 hydrocarbons, isomerization conditions may be about 100 degrees centigrade (° C.) to about 200° C. in one embodiment, or about 120° C. to about 160° C. in other embodiments. For C4 hydrocarbons, isomerization conditions may be about 80° C. to about 180° C. in one embodiment, and about 100° C. to about 150° C. in other embodiments. Operating pressures have little impact on the equilibrium concentrations of the normal and branched hydrocarbons, and are typically controlled at about the vapor pressure of the hydrocarbons in the hydrocarbon stream 10 such that the hydrocarbon stream is partially liquid and partially gaseous when contacting the catalyst 16. Lower temperatures tend to favor higher concentrations of branched hydrocarbons at equilibrium, but the reaction rate is slower.

The isomerization catalyst 16 can be any suitable catalyst composition that provides for the equilibrium isomerization of normal alkane hydrocarbons. In one embodiment, the catalyst 16 includes a platinum group component in association with a porous solid carrier. The platinum group component is one or more of platinum, palladium, iridium, rhodium, ruthenium, and osmium. The porous solid carrier is a porous inorganic oxide and preferably a high surface area inorganic oxide, for example, an inorganic oxide having a surface area of from about 50 to about 700 cubic meters per gram. Satisfactory porous solid carriers for the preparation of the catalyst for use in the process described herein include silica, zirconia, magnesia, thoria, alumina, and the like, and combinations thereof, for example, silica-alumina, silica-zirconia, alumina-silica-magnesia, alumina-thoria, alumina-thoria-zirconia, and the like. In many embodiments, the carrier includes alumina.

The hydrocarbon stream 10 is converted to an intermediate isomerized stream 30 in the reactor 14, where the intermediate isomerized stream 30 has a higher concentration of branched hydrocarbons than the hydrocarbon stream 10 introduced to the reactor 14. The intermediate isomerized stream 30 is fed into a fractionation zone 32 to produce a heavy isomerized stream 34 at a bottoms outlet 35 and an off gas stream 36 at an overheads outlet 38, so the reactor 14 is fluidly coupled to the fractionation zone 32. In one embodiment, the fractionation zone 32 includes a single fractionator, but in other embodiments the fractionation zone 32 includes two or more fractionators. The fractionation zone 32 may also produce a hydrocarbon recycle stream (not shown) in some embodiments, where the straight chain hydrocarbons are recovered from the fractionation zone 32 and re-introduced to the reactor 14. In some embodiments, the off gas stream 36 includes excess hydrogen, hydrochloric acid displaced from the catalyst 16, light hydrocarbons, water, and other gases or low boiling compounds such as any entrained nitrogen, carbon dioxide, etc. In other embodiments, the catalyst 16 is not chlorided so the off gas stream 36 does not include hydrochloric acid, but still requires drying before being recycled to recover the hydrogen. The heavy isomerized stream 34 includes the branched hydrocarbons produced in the reactor 14, where the number of carbon atoms is about the same as in the hydrocarbon stream 10 feed, and may include unreacted straight chain hydrocarbons in some embodiments. The heavy isomerized stream 34 may be blended in gasoline, re-isomerized to further increase the octane rating, further fractionated, or otherwise processed or used.

In an exemplary embodiment, the off gas stream 36 is split into an off gas recycle stream 40 and an off gas discharge stream 42. The off gas discharge stream 42 can be fed into a caustic scrubber 44, so the fractionation zone 32 is fluidly coupled to the caustic scrubber 44. Hydrochloric acid in the off gas discharge stream 42 reacts with caustic in the caustic scrubber 44 to form salt, and thereby neutralize the hydrochloric acid and render the off gas discharge stream 42 less corrosive. After the caustic scrubber 44, the off gas discharge stream 42 can be discharged or processed in other manners. The off gas recycle stream 40 is dried in an off gas dryer 46 to produce a hydrogen recycle stream 48 that is returned to the reactor 14 for reuse. The off gas stream 36 may be split to bleed off non condensables, impurities, or other undesired components that would otherwise gradually build up in the reactor system. The off gas discharge stream 42 acts as the purge stream, when a purge is used. In some embodiments, much of the off gas stream 36 is recycled as the hydrogen recycle stream 48, so the volume of the off gas discharge stream 42 is significantly reduced. The smaller flow may allow for the economical use of chloride adsorbers (not shown) in place of the caustic scrubber 44. Very large chloride adsorbers are required for large flow rates, and the adsorbent must be replaced frequently, which increases the capital and maintenance costs. Chloride adsorbers could eliminate the use of caustic for the caustic scrubber 44, because of the reduced flow rate of the off gas discharge stream 42, and the reduced caustic use could further improve the economics of using the off gas dryer 46.

The hydrogen recycle stream 48 includes hydrogen, so the amount of make-up hydrogen from the feed make-up hydrogen stream 20 can be reduced. In some embodiments, the hydrogen recycle stream 48 is about 80 mass percent hydrogen, so hydrogen may be the primary component of the hydrogen recycle stream 48. The hydrogen recycle stream 48 also includes hydrochloric acid, which is a chloriding agent, so the amount of chloriding agent needed from the chloriding stream 22 also may be reduced. In an exemplary embodiment, the amount of chloriding agent can be reduced by up to 100 percent, and in other embodiments by about 10 to about 80 percent. In some locations, compressed hydrogen is supplied in cylinders, so its use is expensive and time consuming. The ability to recycle hydrogen from some or all of the off gas stream 36 in such locations is especially attractive. The hydrogen recycle stream 48 can be combined with hydrogen from the feed make-up hydrogen stream 20, or it can be introduced into the reactor 14 by a separate line.

Figure 2:
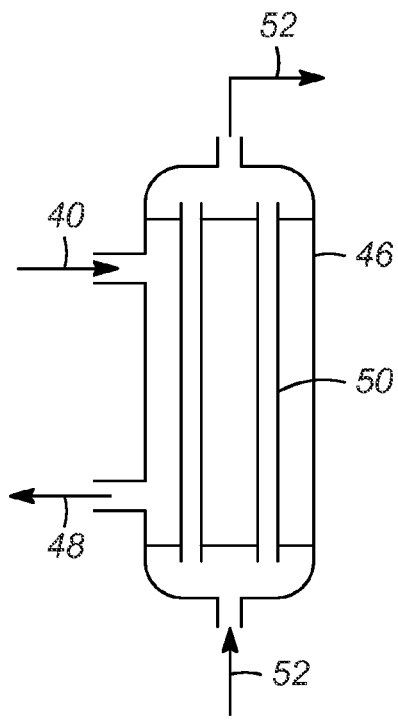
FIG. 2 is a sectional side view of an exemplary embodiment of an off gas dryer.

Referring now to FIG. 2, with continuing reference to FIG. 1, the off gas dryer 46 includes an off gas dryer membrane 50 separating the off gas recycle stream 40 from an off gas purge stream 52. Water passes through the off gas dryer membrane 50 from the off gas recycle stream 40 and evaporates in the off gas purge stream 52 in a process called perevaporation. Most compounds other than water will not pass through the off gas dryer membrane 50. This process is driven by the humidity gradient between the off gas recycle stream 40 and the off gas purge stream 52. The water content of the off gas purge stream 52 is kept low, so there is a higher humidity in the off gas recycle stream 40 than in the off gas purge stream 52. The selectivity of the off gas dryer membrane 50 is higher when the off gas recycle stream 40 and the off gas purge stream 52 are in the vapor phase, because there are fewer ionic species present. In an exemplary embodiment, the off gas purge stream 52 is a dry air stream. The off gas purge stream 52 increases in humidity while passing through the off gas dryer 46, but essentially no other compounds enter the off gas purge stream 52. The off gas purge stream 52 can be further processed or used, but the lack of contaminants allows for little to no environmental controls in embodiments where the off gas purge stream 52 is vented to the atmosphere.

In some embodiments, the off gas dryer membrane 50 is a tube, as illustrated, with one stream flowing through the tube and the other stream flowing around the outside of the tube, where either stream can flow through the center or around the outside of the tube. In alternate embodiments, the off gas dryer membrane 50 is a planar sheet, with one stream on one side of the sheet and the other stream on the other side of the sheet. In yet another embodiment, a plurality of off gas dryers 46 are used in succession where the off gas dryer membrane 50 includes a plurality of beads made of the membrane material. The beads can be solid membrane material, or hollow with a space or volume contained within an outer skin of membrane material. In this embodiment, water passes from the off gas recycle stream 40 into the bead, where the water is either absorbed by the membrane material for solid beads, or passes through the membrane material into the inner space for hollow beads. After a period of use, the off gas purge stream 52 is directed through a second off gas dryer 46 while the first off gas dryer 46 is regenerated, and the process is then repeated as needed. An off gas dryer 46 with beads can be regenerated by passing a dry gas, such as dry air, over the beads to pervaporate the water vapor from within the beads. The off gas dryer membrane 50 can be many other shapes, as long as the off gas dryer membrane 50 is positioned between the two streams such that the streams are separated.

In an exemplary embodiment, the off gas dryer membrane 50 is a perfluorosulfonated ionomer, such as those commercially available under the trademarks NAFION®, ACIPLEX®, or FLEMION®. An ionomer is defined as the category of ion-containing or ion-conducting polymers, which are not substantially cross linked, where the polymer structure is maintained by intermolecular forces in crystalline domains of main chains and where a second domain of ion-conducting paths forms. At low temperatures, ionic components in the polymer form "clusters" that give the polymer a ridged form similar to a cross-linked polymer, but without any substantial cross-linking covalent bonds. At higher temperatures, the clusters break up such that the non-cross linked ionomer polymers are thermoplastic and can be cast and formed as desired. The perfluorosulfonated ionomer is very selective such that only certain compounds are transported across the off gas dryer membrane 50. Water is readily transported, as are some cationic compounds when used with liquid compounds. When used in the gas phase, the perfluorosulfonated ionomers are much more selective, because ionic compounds do not dissociate in the gas phase at moderate temperatures, such as temperatures below about 150° C. In the gas phase, the primary compounds that will transfer across the off gas dryer membrane 50 are those with a hydroxyl group, such as water, ammonia (when water is present), and alcohols (or organic compounds that can be converted into alcohols.) The isomerization process converts compounds with hydroxyl groups into water and compounds that do not have hydroxyl compounds, so water is the primary compound in the off gas recycle stream 40 with a hydroxyl group.

The perfluorosulfonated ionomer is typically formed by co-polymerizing tetrachloroethylene with a fluoride vinyl ether terminating in one of a sulphonyl group or a carboxylate group. In embodiments where the fluoride vinyl ether terminates in a sulphonyl group, the sulphonyl group is often fluorinated during polymerization. After polymerization, the sulfonyl group is converted into a sulfonate by reacting with a base such as sodium hydroxide, and various cations can be associated with the sulfonate group, including but not limited to lithium, sodium, and potassium. In some embodiments, the sulfonate is then converted into a sulfonic acid (—SO$_3^-$H$^+$), where the cation is hydrogen. Some embodiments of the perfluorosulfonated ionomer structure is shown below:

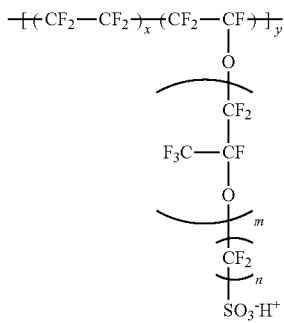

where x=5 to 14, y=100 or more, m=0 to 4, and n=1 to 5.

The variable "x" in the above formula represents the ratio of the tetrafluoroethylene co-monomer to the sulphonyl fluoride vinyl ether co-monomer, so in embodiments where x=5, the copolymer is formed with a ratio of 5 tetrafluoroethylene monomers to each sulphonyl fluoride vinyl ether monomer.

In some embodiments, the off gas dryer membrane 50 is a copolymer of tetrafluoroethylene and perfluoro-3,6-dioxa-4-methyl-7-octene-sulfonic acid ("PFSA"). In this embodiment, m=1 and n=2 in the above formula. In some embodiments, the molar ratio of tetrafluoroethylene to PFSA is between about 6/1 to about 8/1. The ratio of the tetrafluoroethylene to PFSA controls the ionic conductivity of the polymer, so changing the ratio impacts the permeability of the polymer. A molar ratio of tetrafluoroethylene to PFSA of about 6/1 to about 8/1 provides good conductivity of water with very little conductivity of most other compounds.

Many theories suggest the mechanism for water transport across a perfluorosulfonated ionomer, and most suggest the ionic sulfonate forms clusters or groups that facilitate transport of the water. The ionic nature of the sulfonate group actually attracts water, so the off gas dryer membrane 50 can remove water from the off gas recycle stream 40 very rapidly, with water removal beginning within a few nanoseconds in some embodiments. The perfluorosulfonated ionomer is thermally stable up to about 160° C., and it is very resistant to chemical attack with chemical resistance similar to poly tetrafluoroethylene. In an embodiment, the off gas recycle stream 40 is kept at a temperature above the dew point, so no liquid is present in the off gas dryer 46. Water is removed from the off gas dryer 46 by the off gas purge stream 52, and the off gas purge stream 52 flows through the off gas dryer 46. Therefore, the off gas dryer 46 is continually regenerated while in use as the off gas purge stream 52 exits. The life span of the perfluorosulfonated ionomer is long, even in corrosive environments, so very little to no maintenance is required for the off gas dryer 46.

Figure 3:
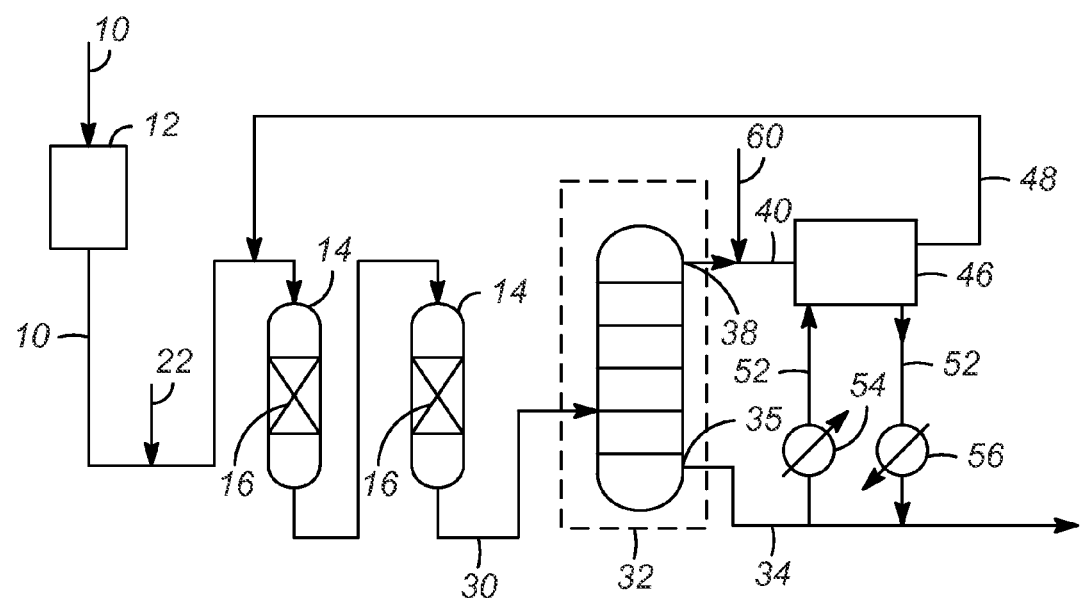
FIGS. 3 and 4 are schematic diagrams of different exemplary embodiments of an apparatus and method for isomerizing the hydrocarbon stream.

In an exemplary embodiment, the heavy isomerized stream 34 is used as the off gas purge stream 52, as illustrated in FIG. 3. The heavy isomerized stream 34 has a very low water content, because water exits the fractionation zone 32 in the off gas stream 36. The heavy isomerized stream 34, or a portion thereof, can flow through an off gas vaporizer 54 to produce a vapor for the off gas purge stream 52. After flowing through the off gas dryer 46, the off gas purge stream 52 is condensed in an off gas condenser 56. Water introduced into the heavy isomerized stream 34 from the off gas recycle stream 40 can be separated by a variety of methods, but in some embodiments the water concentration is low enough that it can remain in the heavy isomerized stream 34 without adverse effects.

FIG. 3 illustrates an exemplary embodiment for introducing make-up hydrogen to the process. A raw make-up hydrogen stream 60 is introduced into the off gas recycle stream 40 upstream from the off gas dryer 46. The raw make-up hydrogen stream 60 may include water as well as other impurities such as carbon dioxide, carbon monoxide, and others. The raw make-up hydrogen stream 60 is dried in the off gas dryer 46, so a separate dryer for the raw make-up hydrogen stream 60 is not needed.

Figure 4:
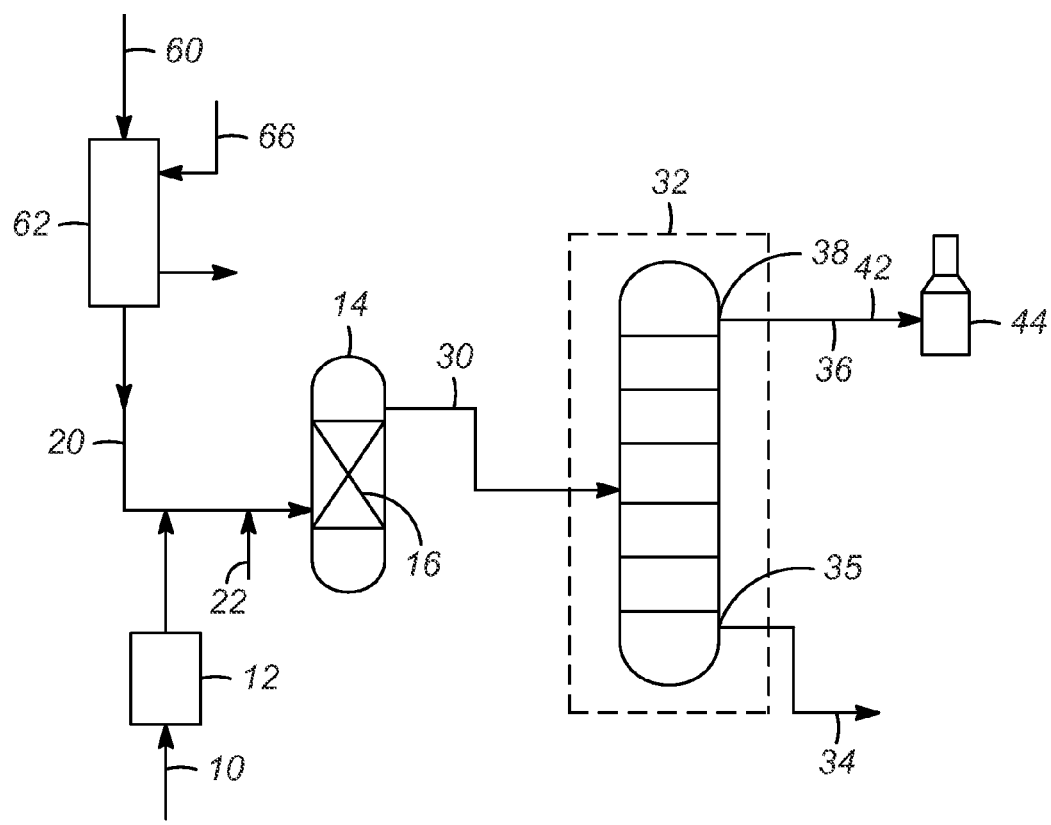
Figure 5:
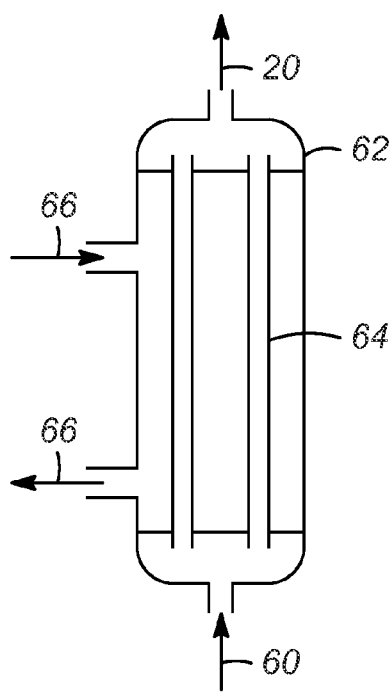
FIG. 5 is a sectional side view of a make-up hydrogen dryer.

Reference is now made to the exemplary embodiment in FIGS. 4 and 5. In this embodiment, the entire off gas stream 36 is sent to the caustic scrubber 44, because a hydrogen recycle stream that utilizes an off gas dryer is not produced. An off gas dryer 46 can be installed on the hydrogen-containing vaporous discharge from the caustic scrubber 44 to remove water and recover the hydrogen. Hydrochloric acid has been removed by the caustic scrubber 44, so the hydrogen can be recovered and returned to the reactor 14 or used in other processes. In the exemplary embodiment shown, a raw make-up hydrogen stream 60, which includes water and other impurities as mentioned above, is directed to a make-up hydrogen dryer 62. The feed make-up hydrogen stream 20 exits the make-up hydrogen dryer 62 after the water is removed. The make-up hydrogen dryer 62 includes a make-up hydrogen dryer membrane 64 separating the raw make-up hydrogen stream 60 from a make-up hydrogen purge stream 66. The make-up hydrogen dryer membrane 64 includes a perfluorosulfonated ionomer membrane as described above for the off gas dryer membrane 50. The make-up hydrogen dryer membrane 64 includes the same embodiments of the perfluorosulfonated ionomer as the off gas dryer membrane 50. The make-up hydrogen purge stream 66 can be dry air, the heavy isomerized stream 34, or other low humidity gaseous streams, as described above. Operating conditions are the same as for the off gas dryer 46.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

The invention claimed is:

1. A method of isomerizing hydrocarbons, the method comprising the steps of:
    isomerizing a hydrocarbon stream in a reactor to produce an intermediate isomerized stream;
    fractionating the intermediate isomerized stream to produce an off gas stream and a heavy isomerized stream, wherein the off gas stream comprises an off gas recycle stream;
    drying the off gas recycle stream in an off gas dryer to produce a hydrogen recycle stream, wherein the off gas dryer comprises an off gas dryer membrane separating the off gas recycle stream from an off gas purge stream, wherein the off gas dryer membrane comprises a copolymer of tetrafluoroethylene and perfluoro-3,6-dioxa-4-methyl-7-octene-sulfonic acid, and wherein a molar ratio of tetrafluoroethylene to perfluoro-3,6-dioxa-4-methyl-7-octene-sulfonic acid in the copolymer is from about 6/1 to about 8/1; and
    feeding the hydrogen recycle stream into the reactor.

2. The method of claim 1 wherein the off gas dryer membrane is in a sulfonate salt state wherein a counter cation is lithium ($Li^+$), sodium ($Na^+$), or potassium ($K^+$).

3. The method of claim 1 wherein isomerizing the hydrocarbon stream in the reactor further comprises isomerizing the hydrocarbon stream in the reactor wherein the reactor comprises a catalyst, wherein the catalyst comprises a platinum group metal on a porous substrate, the porous substrate comprises alumina, and wherein the catalyst is in a chlorided state.

4. The method of claim 3 wherein isomerizing the hydrocarbon stream further comprises feeding the hydrocarbon stream to the reactor wherein the hydrocarbon stream comprises 80 mass percent or more hydrocarbons having 5 or 6 carbon atoms.

5. The method of claim 3 wherein isomerizing the hydrocarbon stream further comprises feeding the hydrocarbon stream to the reactor wherein the hydrocarbon stream comprises 80 mass percent or more hydrocarbons having 4 carbons atoms.

6. The method of claim 1 wherein the off gas purge stream comprises the heavy isomerized stream.

7. The method of claim 1 wherein the off gas purge stream comprises a dry air stream.

8. The method of claim 1 further comprising:
    drying a raw make-up hydrogen stream in a make-up hydrogen dryer to produce a feed make-up hydrogen stream, wherein the make-up hydrogen dryer further comprises a feed make-up hydrogen dryer membrane separating the raw make-up hydrogen stream from a make-up hydrogen purge stream, and wherein the feed make-up hydrogen dryer membrane comprises a perfluorosulfonated ionomer; and
    feeding the feed make-up hydrogen stream into the reactor.

9. The method of claim 1 further comprising:
    drying a raw make-up hydrogen stream in the off gas dryer.

10. The method of claim 1 further comprising:
    splitting the off gas stream into the off gas recycle stream and an off gas discharge stream; and
    feeding the off gas discharge stream into a caustic scrubber.

11. The method of claim 1 wherein drying the off gas recycle stream in the off gas dryer further comprises drying the off gas recycle stream in the off gas dryer wherein the off gas dryer comprises a tube.

12. A method of isomerizing hydrocarbons, the method comprising the steps of:
    contacting a hydrocarbon stream with a catalyst to produce an intermediate isomerized stream;
    drying a raw make-up hydrogen stream in a make-up hydrogen dryer to produce a feed make-up hydrogen stream, wherein the make-up hydrogen dryer comprises a make-up hydrogen dryer membrane separating the raw make-up hydrogen stream from a make-up hydrogen purge stream, wherein the make-up hydrogen dryer membrane comprises a copolymer of tetrafluoroethylene and perfluoro-3,6-dioxa-4-methyl-7-octene-sulfonic acid, and wherein a molar ratio of tetrafluoroethylene to perfluoro-3,6-dioxa-4-methyl-7-octene-sulfonic acid in the copolymer is from about 6/1 to about 8/1; and
    contacting the feed make-up hydrogen stream with the catalyst and the hydrocarbon stream.

13. The method of claim 12 wherein the make-up hydrogen dryer membrane is in a sulfonate salt state wherein a counter cation is lithium ($Li^+$), sodium ($Na^+$), or potassium ($K^+$).

* * * * *